June 14, 1960     J. W. JENNEY ET AL     2,941,013
PARAFFIN WAX CHLORINATION PROCESS
Filed Nov. 6, 1958
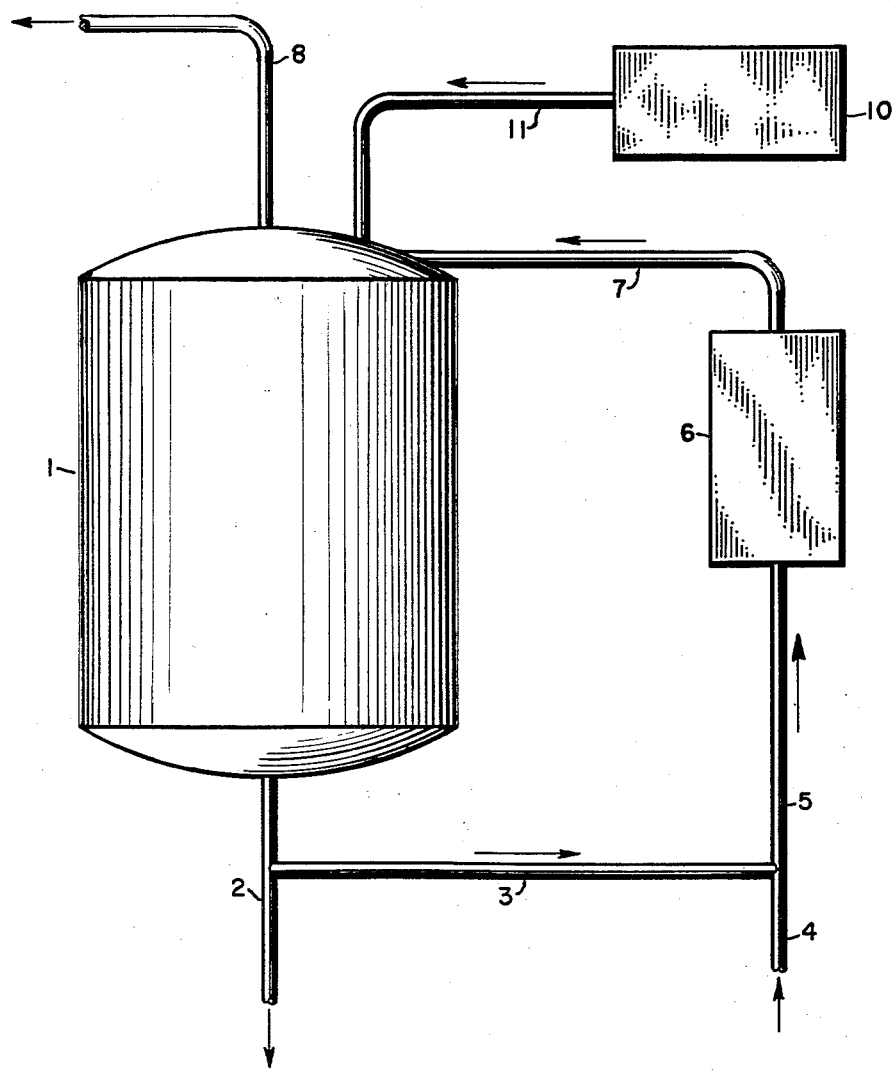
INVENTOR
JOHN W. JENNEY
RICHARD C. RAHN
BY *Fred S. Salles*
ATTORNEY

United States Patent Office 2,941,013
Patented June 14, 1960

2,941,013

PARAFFIN WAX CHLORINATION PROCESS

John W. Jenney, Madison, and Richard C. Rahn, Painesville, Ohio, assignors to Diamond Alkali Company, Cleveland, Ohio, a corporation of Delaware Filed Nov. 6, 1958, Ser. No. 772,656

2 Claims. (Cl. 260—660)

This invention relates to chlorinated paraffin waxes. It relates more particularly to a process for preparing liquid chlorinated paraffin waxes having improved uniform light color and good heat stability.

This is a continuation-in-part of our co-pending application Ser. No. 620,255, now abandoned.

The conventional substitution chlorination of paraffin waxes is well known in the art. The procedure for chlorinating paraffin waxes usually consists of passing chlorine gas through a body of molten wax until it reacts with the desired amount of chlorine. According to this procedure, chlorinated paraffin waxes are produced ranging in chlorine content by weight from as low as 10% up to 70% and higher. The color of the chlorinated waxes produced by this process ranges from red to dark brown to black depending on the chlorine content of the final product.

Chlorinated waxes find many uses in improving and modifying a wide variety of materials. Accordingly, it is desirable in many instances to produce a chlorinated wax of a uniform light color in order to meet the specifications of the user.

This invention has as an object, therefore, the preparation of chlorinated paraffin waxes of improved color characteristics. A further object of this invention is the preparation of liquid chlorinated paraffin waxes of improved uniform light color and good heat stability.

In accordance with the foregoing objects, and others to become apparent hereinafter, this invention relates to an improvement in a process for producing a liquid chlorinated paraffin by contacting a molten paraffinic substance with chlorine, which comprises the steps of contacting a molten body of said substance with gaseous chlorine at a chlorination temperature of below about 90° C., maintaining said temperature until up to about 33% of the desired chlorination has been obtained, and continuing said chlorination at a temperature below about 100° C. until the desired amount of chlorine has reacted. By the process of this invention, it is found that liquid chlorinated paraffins can be prepared possessing improved uniform light color characteristics and good heat stability.

As indicated briefly above, this invention relates to a process for producing liquid chlorinated paraffins by chlorinating a paraffinic substance at optimum temperatures to produce a liquid product that possesses a uniform and desirable color. The term "paraffinic substance" is intended to include paraffin waxes and oils derived from petroleum distillates of mineral oils of the mixed and paraffin base type. Processes for producing such waxes and oils are well known in the art and it is not considered necessary here to describe their preparation. Such products are available commercially. Hereinafter, reference will be made only to paraffin waxes, it being understood that the invention also includes paraffin oils adaptable to this process.

Preferred paraffin waxes employed in the process of this invention are those containing long-chain paraffinic molecules, preferably from 18 to 28 carbon atoms. Paraffin waxes of this type ordinarily have a melting point range of about 45 to 60° C. It should be understood, however, that paraffin waxes having higher or lower melting point ranges can also be employed. The preferred melting point range of the paraffin waxes to be employed in the process of this invention is about 47 to 54° C. Generally, such paraffin waxes consist of straight-chain hydrocarbon molecules, although the material can also contain minor amounts of branch-chain or other molecular configurations.

In chlorinating a molten body of paraffin wax, it is not considered essential to employ a chlorine gas of 100% purity. Thus, chlorine gas from electrolytic cells, i.e., from the electrolysis of brine, can be suitably employed. Such chlorine gas can consist of, for example, 90% or more of chlorine with the rest of the material consisting of oxygen, hydrogen, carbondioxide and nitrogen, the latter being the major impurity. It is found that a gaseous material comprising 90 to 95% chlorine gives desirable results in paraffin wax chlorination reactions.

In the preferred embodiment of this inventon, a liquid chlorinated paraffin wax of improved uniform light color and heat stability is prepared by contacting a molten body of paraffin wax with gaseous chlorine in a reaction zone, said chlorine gas introduced under pressure, and the reaction carried out at a temperature of below about 90° C. for a period of time sufficient to obtain up to about 33% of the chlorination, and thereafter continuing the chlorination below a temperature of about 100° C. until the desired amount of chlorine has reacted.

In the preferred embodiment of this invention, the amount of chlorine that can be chemically introduced into the paraffin wax ranges from 30 to 50% by weight of the wax. A more preferred amount of chlorine to be chemically introduced into the wax is about 40% by weight of the wax.

The products of this invention are liquid and differ in regard to chemical and physical properties, for example, viscosity and degree of chlorination, as will be understood by those skilled in the art. Excellent results in regard to color and heat stability of the liquid chlorinated materials are obtained with paraffin waxes chlorinated to about 40% by weight.

In the process of this invention, gaseous chlorine is preferably introduced at a pressure of from 10 to 25 lbs. per square inch to contact a body of molten paraffin wax. The contact is carried out for a prolonged period of time, such time depending, of course, on the amount of chlorine to be introduced into the wax, the pressure of the chlorine, and the temperature of the reaction.

In order to faciltate the control of the reaction temperature, i.e., below 90° C., chlorine is metered to the reaction zone in an amount calculated to prevent an excessive rise of temperature, since as is well known, the reaction of paraffin wax and chlorine is exothermic. Cooling means are conveniently provided in the reaction vessel to control the temperature within the desired limits.

The time required to cause chlorination will vary with the degree or amount of chlorination desired. It is found that for producing a paraffin wax of about 40% by weight chemically combined chlorine, the time required is in the order of from 50 to 80 hours when employing the reaction conditions of this invention. This time, of course, can also vary with the efficiency of the chlorinating apparatus and the temperatures employed in the reaction.

The chlorination temperatures employed for the first step in the preferred embodiment of this invention are about from 60 to 90° C. In general, the lower the temperature, the better the result insofar as color is concerned and in consequence of this, an optimum temperature for superior results is 85° C. Accordingly, a temperature of 85° C. is preferred, although lower temperatures can be used but would require reduction in chlorine feed rate and thus a longer batch cycle. If temperatures higher than 90° C. are employed, the product is off color. It should be understood, however, that this off colored product is suitable foe many uses where other properties of the material are more important than its color. The lower temperature of the chlorination is limited, of course, to the melting point of the paraffin wax used.

Novel and unexpected results are obtained in regard to the color characteristics of the chlorinated paraffin wax if the body of the molten wax is contacted with chlorine at a temperature of about 15 to 20 degrees above its melting point and thereafter chlorinating the mixture at a temperature of about 85° C. until from 25 to 33% of the desired chlorination has been obtained. Superior results are obtained by contacting gaseous chlorine with molten paraffin wax until about 33% of the chlorine desired to be introduced into the wax has reacted and the temperature is kept at about 85° C. The chlorination can thereafter be continued at slightly higher temperatures if desired, i.e., to speed up the batch cycle, but it is desirable to keep such temperatures below about 100° C. inasmuch as the color of the final product can be adversely affected if higher temperatures are used.

In order that the invention may be more fully understood, reference is made to the accompanying drawing illustrating a diagrammatic view of an apparatus for carrying out the process according to the preferred procedure described above.

In the drawing, numeral 1 represents generally a glass-lined vessel which is provided with a cooling jacket (not shown) surrounding the vessel. The vessel is provided with line 2 at the bottom for withdrawing the contents therefrom and line 3 to circulate the molten material to reaction zone 6 where the major part of the reaction of chlorine with wax is effected. Chlorine gas is introduced under pressure by line 4 and lifts the molten wax through line 5 to reaction zone 6. The contents from reaction zone 6 are conveyed to the top of the vessel 1 by line 7. Gaseous products from the reaction such as chlorine and hydrogen chloride are taken from the top of the reactor by line 8 for recovery as is well known in the art. Numeral 10 indicates a storage vessel for paraffin wax and can be provided with heating means for melting the wax. The wax can be introduced from storage vessel 10 to glass-lined vessel 1 by line 11 as shown.

In preparing a liquid chlorinated paraffin wax according to the process of this invention, molten paraffin wax at a temperature of about 15 to 20 degrees above its melting point is introduced from storage vessel 10 by line 11 to vessel 1. The wax flows from vessel 1 by gravity through lines 2 and 3 and is contacted with gaseous chlorine at a pressure of from 10 to 25 lbs. per square inch at line 5. The chlorine pressure is sufficient to lift and circulate the molten wax to the reaction zone and back to the vessel 1. The temperature of the wax is maintained at about 85° C. in the glass-lined vessel by cooling means, e.g., a water jacket, and by regulating the chlorine flow into the reaction zone 6. The chlorine flow into reactor 6 cannot be dropped below that necessary to lift and circulate the molten wax back into vessel 1.

If desired, during chlorination of the molten paraffin wax, the temperature in vessel 1 can be maintained at a slightly higher temperature, i.e., about 90° C., but not above, since a higher temperature can affect the color of the finished product. If the molten paraffin wax in vessel 1 is maintained at a temperature near 90° C. it is desirable that the temperature in the reaction zone 6 be kept at about 85° C. in order that the finished product possess a good uniform light color. Good results are obtained if the temperature in the lines are kept at about 84–85° C. in line 3 and about 85° C. in line 7. By-products from the reaction, such as chlorine and hydrogen chloride, are taken by line 8, processed to recover chlorine and hydrogen chloride, and disposed of in any appropriate manner. The molten chlorinated paraffin wax after being tested to determine its chlorine content is withdrawn by line 2 if it contains the desired amount of chemically combined chlorine and treated in a separate area (not shown) to remove undissolved chlorine or hydrogen chloride, such as by air blowing.

The following examples will serve to illustrate the process of the invention when carried out in a commercial apparatus such as described in the drawing.

*Example I*

To a glass-lined vessel of approximately 1500 gallon capacity, such as shown in the drawing, is added 7500 lbs. of molten paraffin wax of a melting point of about 49 to 53° C. and at a temperature of 15 to 20 degrees above its melting point. Chlorine gas at a pressure of between 10 to 25 lbs. per square inch is introduced into line 5 and metered at approximately 200 lbs. per hour for a period of approximately 20 hours. During this time, the temperature in the reactor is maintained between 80–85° C. The reaction during this 20-hour period is sufficient to cause about 33% of the chlorination desired. The chlorine feed after this period is then increased to about 250 lbs. per hour and the reaction is continued for about an additional 40 hours. During this time, the reaction temperature is 90–95° C. The total reaction time is about 60 hours and at the end of this period the paraffin wax is chlorinated to an extent of 40% by weight chemically combined chlorine.

The chlorinated paraffin wax from Example I has a color index of from 1 to 2 on the Gardner Color Scale (H. A. Gardner, "Physical and Chemical Examination of Paints, Varnishes, Lacquers, and Colors," Ninth edition, Washington Institute of Paint and Varnish Research, 1939). The product is of medium to low viscosity and is a liquid of clear light amber color having good heat stability and containing 40% by weight chemically combined chlorine. If desired, this product can be stabilized by additives for a long storage life.

*Example II*

In order to show the novel and unexpected results of this invention, a molten paraffin wax is chlorinated according to the following procedure: Gaseous chlorine is introduced at a pressure of about 10 to 25 lbs. per square inch and in an amount of about 230 lbs. per hour to contact about 7500 lbs. of molten wax. The reaction is carried out at a temperature of above 95° C. for about 60 hours. At the end of the reaction period, the product containing 40% by weight chemically combined chlorine is examined and found to be dark and off color and consequently, objectionable for many commercial uses. This chlorinated paraffin wax is found to have a color index of from 4 to 6 on the Gardner Color Scale.

The reason for the off color of the product when the reaction is carried out at temperatures above 90° C. is not completely understood. However, it has been established that by holding the temperature at below 90° C. and preferably at 85° C., until about 33% of the desired reaction has occurred and thereafter raising the temperature to about 95° C. if desired, there is obtained a clear light color liquid chlorinated wax which is an improved product over that of Example II insofar as light color uniformity is concerned.

The liquid chlorinated paraffin waxes of this invention find many uses in industry. Examples of such uses are as plasticizers, with resins and polymers for use in protective and decorative coatings. Additionally, the liquid chlorinated waxes of this invention can also be used in finishing fabrics, as flame retardant compositions, and are compatible with synthetic rubbers and the like to help maintain flame and chemical resistance in such stocks. Other uses will be apparent to those skilled in the art.

The advantages to be realized by the process of this invention are: A chlorinated liquid paraffin wax can be produced possessing uniform light color characteristics and good heat stability; the process is simple and the conditions are easily controlled.

Although this invention has been described with specific reference to the preparation of liquid chlorinated paraffin waxes of about 40% by weight of chlorine, the process is applicable to the production of chlorinated waxes of higher or lower chlorine content.

Accordingly, it is intended to cover all modifications of the invention that fall within the spirit of the invention and the scope of the appended claims.

What is claimed is:

1. In a process for producing a chlorinated paraffin wax containing about 40% by weight of chemically combined chlorine, by contacting a molten body of paraffin wax with gaseous chlorine, the improvement which comprises the steps of contacting said molten body of paraffin wax with gaseous chlorine at a chlorination temperature between about 60 to 90° C., in the absence of a solvent, maintaining said temperature until up to about 33% of the desired chlorination has been obtained, and continuing said reaction at a temperature of below about 100° C. until sufficient chlorine has reacted to produce a chlorinated paraffin wax containing about 40% by weight of chemically combined chlorine.

2. The process according to claim 1 in which the chlorination temperature is 85° C.

References Cited in the file of this patent

UNITED STATES PATENTS

| | | |
|---|---|---|
| 1,129,165 | Buchner | Feb. 23, 1915 |
| 1,953,286 | Barth | Apr. 3, 1934 |
| 2,189,924 | Pier et al. | Feb. 13, 1940 |
| 2,214,877 | Clark | Sept. 17, 1940 |

FOREIGN PATENTS

| | | |
|---|---|---|
| 199,073 | Great Britain | June 18, 1923 |